(12) United States Patent
Becker et al.

(10) Patent No.: US 12,110,197 B2
(45) Date of Patent: Oct. 8, 2024

(54) BLOCK STACKING ARRANGEMENT

(71) Applicant: Jungheinrich Aktiengesellschaft, Hamburg (DE)

(72) Inventors: Michael Becker, Hainburg (DE); Jörg Cavelius, Bad Vilbel (DE); Timm Morawietz, Tholey-Überroth (DE); Markus Liebhaber, Oberursel (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 18/115,925

(22) Filed: Mar. 1, 2023

(65) Prior Publication Data

US 2023/0278813 A1 Sep. 7, 2023

(30) Foreign Application Priority Data

Mar. 3, 2022 (EP) .................................... 22159997

(51) Int. Cl.
*B65G 60/00* (2006.01)
*B25J 3/00* (2006.01)
*B25J 9/16* (2006.01)
*B25J 11/00* (2006.01)

(52) U.S. Cl.
CPC ................ *B65G 60/00* (2013.01); *B25J 3/00* (2013.01); *B25J 9/162* (2013.01); *B25J 9/1682* (2013.01); *B25J 11/005* (2013.01); *B65G 2814/0311* (2013.01)

(58) Field of Classification Search
CPC .... B65G 60/00; B65G 57/302; B65G 1/0471; B65G 2814/0311; B65G 1/14; B65G 1/0464; B65G 2201/025; B25J 11/005; B25J 9/162; B25J 3/00; B25J 9/1682
See application file for complete search history.

(56) References Cited

U.S. PATENT DOCUMENTS 3,964,619 A 6/1976 Irmler
10,442,621 B2 * 10/2019 Bestic .................. B65G 1/0471
10,919,699 B2 * 2/2021 Clarke .................. G06F 1/3203
(Continued)

FOREIGN PATENT DOCUMENTS

AT 327097 B * 1/1976 ........... B65G 1/0471
DE 2 252 584 A1 5/1974
(Continued)

OTHER PUBLICATIONS

Extended European Search Report issued in EP Patent Application No. 22159997.0, dated Aug. 29, 2022.

*Primary Examiner* — Gregory W Adams
(74) *Attorney, Agent, or Firm* — GREENBLUM & BERNSTEIN, P.L.C.

(57) ABSTRACT

A block stacking arrangement having multiple container stacking slots and a loading space arranged below the container stacking slots in a direction of gravity, a pass-through opening being arranged between each container stacking slot and the loading space, via which a container can be moved out of the loading space into the container stacking slot or from the container stacking slot into the loading space and which has a holding device. Good flexibility of the block stacking arrangement is achieved at least because at least two pass-through openings have different sizes.

9 Claims, 2 Drawing Sheets

(56) References Cited

U.S. PATENT DOCUMENTS

| | | | | |
|---|---|---|---|---|
| 2010/0247275 A1* | 9/2010 | Karlen | ................ | B65D 88/022 414/807 |
| 2017/0129703 A1* | 5/2017 | Lindbo | ................ | B65G 1/0464 |
| 2021/0053777 A1* | 2/2021 | Harting | ................ | B65G 1/0471 |

FOREIGN PATENT DOCUMENTS

| | | | | |
|---|---|---|---|---|
| DE | 102013009340 A1 * | 12/2014 | ........... | B65G 1/0471 |
| DE | 10 2019 130 345 A1 | 5/2021 | | |
| EP | 3 929 106 A1 | 12/2021 | | |
| WO | WO-2010097425 A1 * | 9/2010 | ........... | B65G 57/302 |
| WO | 2015/197709 A1 | 12/2015 | | |

* cited by examiner

BLOCK STACKING ARRANGEMENT

CROSS-REFERENCE TO RELATED APPLICATION

This application claims priority under 35 U.S.C. § 119(a) to Europe Application No. 22159997.0, filed Mar. 3, 2022, the disclosure of which is expressly incorporated by reference herein in its entirety.

BACKGROUND

1. Field of the Invention

The present invention relates to a block stacking arrangement having multiple container stacking slots and a loading space arranged below the container stacking slots in the direction of gravity, a pass-through opening being arranged between each container stacking slot and the loading space, via which pass-through opening a container can be moved out of the loading space into the container stacking slot or from the container stacking slot into the loading space and has a holding device, or holder.

Furthermore, the present invention relates to a method for operating a block stacking arrangement with multiple container stacking slots and a loading space arranged below the container stacking slots in the direction of gravity, a pass-through opening being arranged between each container stacking slot and the loading space, said pass-through opening having a holding device.

2. Discussion of Background Information

A block stacking facility describes a storage arrangement with at least one container stacking slot, in which block stacking elements, such as containers, can be stored, relocated, and removed. Here, the container is transferred from the loading space into the container stacking slot or removed from the container stacking slot and transferred into the loading space. During transfer from the loading space into the container stacking slot or vice versa, the container in each case passes through the pass-through opening, which is arranged between the container stacking slot and the loading space. The transfer of the container through the pass-through opening always takes place in the direction of gravity. When multiple containers are stored in a container stacking slot, a container stack is formed. Further designations for the block stacking facility are stacking storage or container stacking storage.

The holding arrangement can assume two positions, a release position and a holding position, wherein in the holding position a container or a container stack is held in the container stacking slot. If the holding device is in the release position, it is possible to remove one or more containers from the container stacking slot. The number of containers to be removed depends on the number of containers located in the container stacking slot. One or more containers can also be transferred into the container stacking slot when the holding device is arranged in the release position.

SUMMARY

An object of the present invention is to propose an arrangement by means of which a good flexibility of the block stacking arrangement is achieved.

This object is achieved by the features set forth in the following independent claims, as well as the features of the dependent claims that are set forth, all of which describe advantageous embodiments of the invention.

The block stacking arrangement of the type mentioned at the outset has at least two pass-through openings of different sizes. Accordingly, it is possible to store differently sized containers via the pass-through openings of different sizes. Accordingly, for example, first articles can be stored in a first container and correspondingly second articles can be stored in a second container, wherein the first containers can be stored and removed via first pass-through openings and the second containers can be stored and removed via second pass-through openings. The first containers are, for example, smaller than the second containers. Further containers of different sizes can also be stored and removed via corresponding pass-through openings, so that the invention can also be applied to more than two pass-through openings of different sizes. A good flexibility of the block stacking arrangement is thereby achieved.

Preferably, the pass-through opening of each container stacking slot is matched to the base area of the container stacking slot. By matching the pass-through opening to the base area of the container stacking slot, it can be ensured, for example, that only containers up to a certain size can be stored in the corresponding container stacking slot. In addition, the matching of the pass-through opening ensures that a container stack located in the container stacking slot is adequately guided through boundaries of the container stacking slot so that the container stack is prevented from toppling.

Preferably, the holding device has at least two holding pawls which are diametrically opposed to each other. The containers are held in the container stacking slot by the holding device, or holder, with at least two holding pawls. In this case, the holding pawls are moved into a release position as part of a container being put into storage. As soon as the holding device with its holding pawls is in the release position, a container can be stored in the container stacking slot. When the container is positioned inside the container stacking slot, the holding device will be transferred into a holding position so that the container or the container stack is held in the container stacking slot. The container or the container stack is held well by the arrangement of the diametrically opposite holding pawls.

Preferably, a loading vehicle is movable within the loading space, which loading vehicle has a lifting device, or lifter, with which a container from the loading space can be placed in a container stacking slot or can be removed from the container stacking slot, wherein the lifting device is fastened on one side to a chassis of the loading vehicle. By means of the loading vehicle, a container can be automatically transferred into a container stacking slot. For this purpose, the loading vehicle takes over a container, for example. As soon as the loading vehicle has received the container, the loading vehicle transfers the container from the loading space into a container stacking slot. The loading vehicle can also remove a container from the container stacking slot and transport it to a destination point. A compact loading vehicle which has a small footprint is achieved by the lifting device being arranged on one side. By using a loading vehicle, the block stacking arrangement can be operated flexibly and automatically.

Preferably, the loading vehicle is a first loading vehicle, and a second loading vehicle can be moved inside the loading space in synchrony with the first loading vehicle, wherein the lifting device of the first loading vehicle is located opposite the lifting device of the second loading vehicle. As a result of this arrangement, the two loading vehicles can move a large, second container together and transfer it into or remove it from a container stacking slot with a correspondingly large pass-through opening. To this end, the two loading vehicles take over the second container together and transfer it to a position below a corresponding container stacking slot. Once arrived there, the two loading vehicles unlock a holding device so that the holding device is put into the release position and the second container can be stored in the container stacking slot by the two loading vehicles. As soon as the second container is stored in the container stacking slot, the holding device is put back into the holding position, and the second container is deposited on the holding device. As an alternative to transporting the large, second container by the two loading vehicles, each loading vehicle can also transport a small, first container alone and insert it into the container stacking slot or remove it from the container stacking slot. This process is carried out analogously to the storage and removal of the large, second container. Through the use of multiple loading vehicles, containers of different sizes can be transported and inserted via correspondingly large pass-through openings into container stacking slots. Accordingly, a good flexibility of the block stacking arrangement is achieved.

Preferably, the two loading vehicles have a common controller. A simple control of both vehicles is achieved by the common control of the two loading vehicles since they can be controlled as a combination or a tandem.

The controller is preferably designed as a master/slave controller. By means of the master/slave controller, one of the two loading vehicles is controlled as a master vehicle and, correspondingly, the other as a slave vehicle. The master vehicle is the dominant member that is followed by the slave. As a result, the slave vehicle is guided by the master vehicle so that simple and precise control of both vehicles is possible.

Furthermore, the above-mentioned object is achieved by a method according to the independent claim set forth below. The method includes the following:
a. Selecting a container stacking slot depending on the size of the container,
b. Storing at least one container in the container stacking slot starting from the loading space.
c. Removing the at least one container from the container stacking slot into the loading space.

As a result of the differently sized pass-through openings, containers of different sizes can be transferred into corresponding container stacking slots. To do so, a container is transferred from the loading space into the container stacking slot via a corresponding pass-through opening. To remove the container, the container is transferred from the container stacking slot via the pass-through opening towards the loading space. The containers are held inside the container stacking slots by a holding device. When multiple containers are arranged in a container stacking slot, they form a container stack which is likewise held by the holding device. The holding device holds the container stack when the holding device is arranged in a holding position. When the holding device is arranged in a release position, a container or multiple containers can be removed from the container stacking slot and transferred into the loading space. By using the pass-through openings of different sizes, differently dimensioned containers can be stored in corresponding container stacking slots so that a good flexibility of the block stacking arrangement is thereby achieved.

Preferably, features b and c are carried out by at least one loading vehicle with a lifting device, wherein the lifting device is arranged on one side of a chassis of the loading vehicle. By the use of the loading vehicle, the block stacking arrangement can be operated automatically, which leads to good flexibility. By arranging the lifting arrangement on the chassis of the loading vehicle, a footprint or a base area of the loading vehicle is kept small.

Preferably, the loading vehicles move synchronously at least at times. When the two loading vehicles move synchronously, the two loading vehicles can jointly transport a container of a corresponding size. The two loading vehicles can also store the correspondingly large container in corresponding container stacking slots via corresponding large pass-through openings, wherein the two loading vehicles lift the container synchronously and transfer it through the pass-through opening into the container stacking slot. Correspondingly, the two loading vehicles can also remove the large container from the container stacking slot via the pass-through opening. Alternatively, the loading vehicles can also individually transport small containers and store or remove them correspondingly. A good flexibility of the block stacking arrangement is thereby achieved.

The at least one loading vehicle preferably actuates the holding device. The actuation of the holding device by the loading vehicle makes it possible to remove containers from the container stacking slot or to deliver them. As a result, containers are securely held within the container stacking slot.

The loading vehicles are preferably controlled by a common controller. Simple control of both vehicles is achieved by the common control of the two loading vehicles. As a result, a computing effort or control effort is kept low.

The controller preferably operates on the basis of the master/slave principle. In the master/slave principle, one of the two loading vehicles which are jointly transporting a large container is selected as the master vehicle and the other is correspondingly the slave vehicle. The master vehicle takes over the task of leading, while the slave vehicle follows the master vehicle. As a result, a simple control of the two vehicles is achieved.

BRIEF DESCRIPTION OF THE DRAWINGS

The invention is described below with reference to preferred exemplary embodiments in conjunction with the drawing. In the figures.

DETAILED DESCRIPTION

Figure 1:
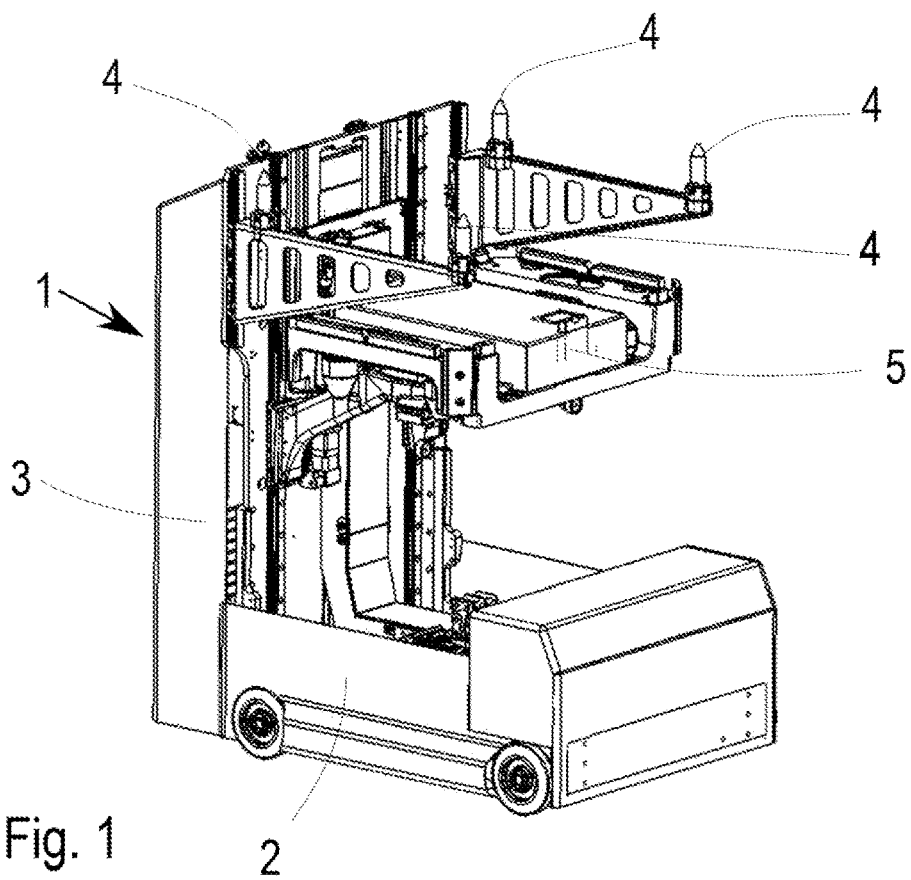
FIG. 1 shows a schematic representation of a loading vehicle.
Figure 3:
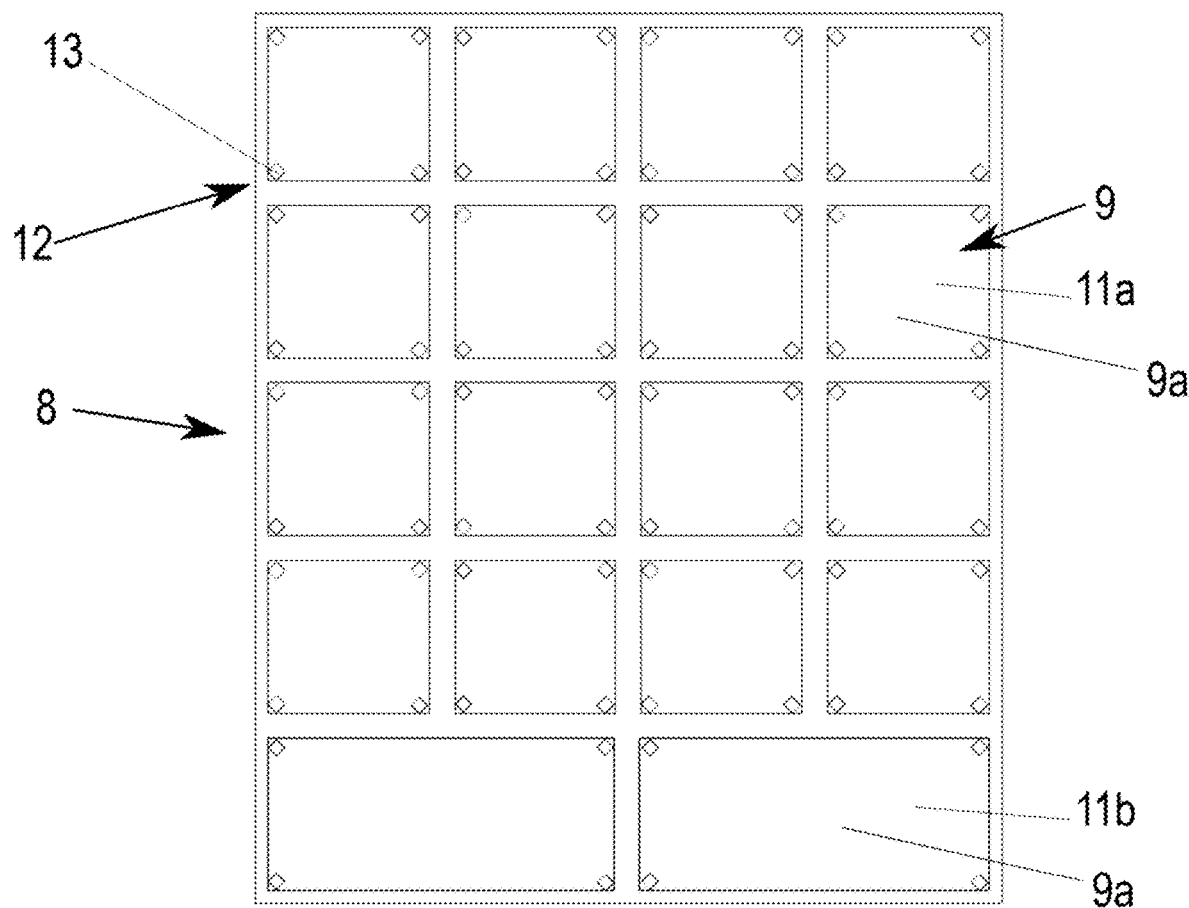
FIG. 3 shows a schematic plan view of a block stacking arrangement.
Figure 4:
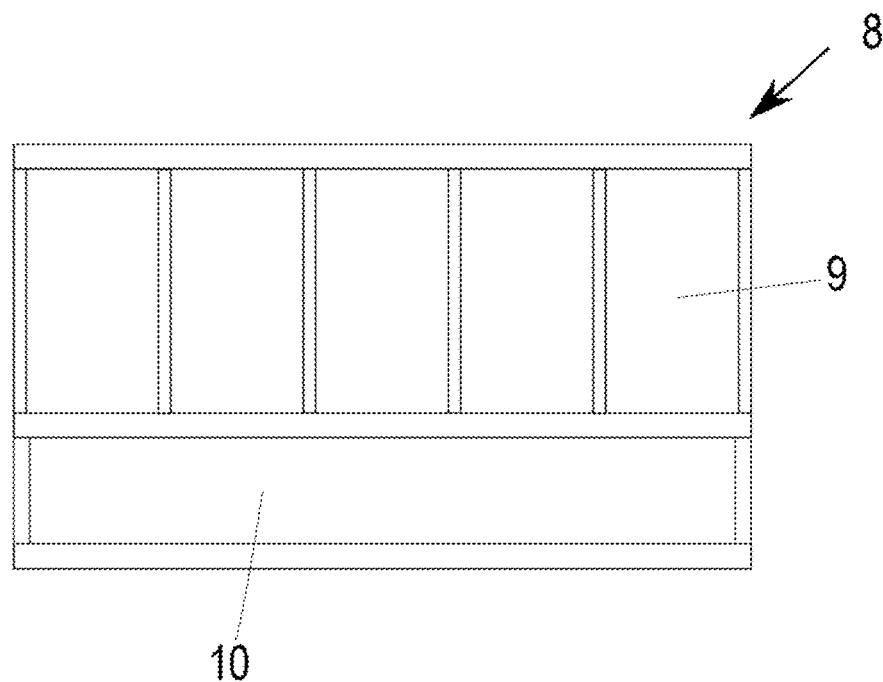
FIG. 4 shows a schematic side view of the block stacking arrangement.

FIG. 1 shows a loading vehicle 1 with a chassis 2 on which a lifting device 3 is arranged on one side. Furthermore, the loading vehicle 1 has a release device 4, or releaser, by means of which a holding device 12 (FIG. 3) of a block stacking arrangement 8 can be actuated. The lifting device 3 has a container holder 5, by which a container (not shown in FIG. 1) can be accommodated.

Figure 2:
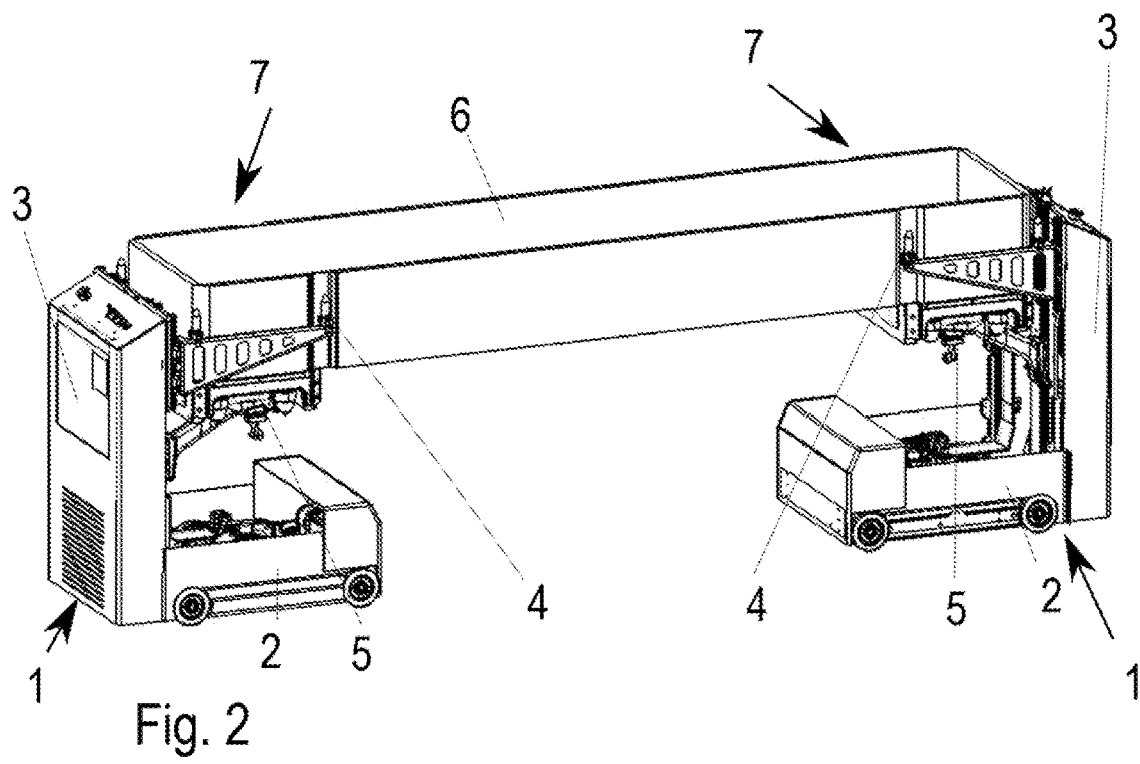
FIG. 2 shows a schematic representation of two loading vehicles that are transporting a large container.

FIG. 2 shows two loading vehicles 1, which together accommodate a container 6. The container 6 has two receiving regions 7 in each case on two opposite end regions of the container 6, wherein the receiving regions 7 can interact with the container holder 5 of the loading vehicle 1.

The loading vehicles 1 and the container 6 are used in the block stacking arrangement 8. The block stacking arrangement 8 has multiple container stacking slots 9 and a loading space 10 arranged below the container stacking slots 9 in the direction of gravity. Here a pass-through opening 11a, 11b is arranged between each container stacking slot 9 and the loading space 10, through which a container can be transferred from the loading space 10 into the container stacking slot 9 or from the container stacking slot 9 into the loading space 10. In this case, the pass-through opening 11a, 11b has a holding device 12 which can be actuated by the release mechanism 4 of the loading vehicle 1. By means of the release mechanism 4, the holding pawls 13 of the holding device 12 can be transferred from a release position into a holding position and vice versa. In the holding position, the holding device 12 holds the containers located in the container stacking slot 9, wherein multiple containers form a container stack. In the release position, on the other hand, a container can be transferred into the container stacking slot 9 and can also be removed again from this container stacking slot 9. For this purpose, the holding device 12 has two or more holding pawls 13, which, for example, lie diametrically opposite one another. The release mechanism 4 is designed in accordance with the arrangement of the holding pawls 13.

As mentioned, a pass-through opening 11a, 11b is arranged between the container stacking slot 9 and the loading space. A base area 9a of the container stacking slot 9 is matched to this pass-through opening 11a, 11b. At least two of the pass-through openings 11a, 11b are of different sizes so that containers of different sizes can be placed in and removed from suitable container stacking slots 9 via corresponding pass-through openings 11a, 11b.

First containers can thus be stored and removed via first pass-through openings 11a and second containers 6 via second pass-through openings 11b. This process is carried out with the aid of one or more loading vehicles 1. First containers are transported by one loading vehicle 1 and second containers 6 by two loading vehicles 1, that is to say stored, retrieved, and relocated. The second containers 6 are, for example, larger than the first containers.

For example, multiple first containers can be transported by one of the loading vehicles 1 in each case, wherein the same loading vehicles 1 subsequently transport second containers 6 in a composite or tandem. Correspondingly, loading vehicles 1 can also transport second containers 6 first and then first containers.

As shown in FIG. 2, two loading vehicles 1 can receive a large container 6. Here the two loading vehicles 1 are arranged accordingly so that the container holders 5 of the respective loading vehicles 1 can interact with receiving regions 7 of the container 6. The loading vehicles 1 are arranged in such a way that the lifting devices 3 of the loading vehicles 1 point outwards, while the container holders 5 of the loading vehicles face one another. As soon as the two loading vehicles 1 have received a container 6, they move synchronously. This means that the container 6 is raised, lowered, or moved synchronously. The two loading vehicles are controlled by a common controller. As a result of the common control, the two loading vehicles 1 act as a unit, so that a simple control can be realized. Furthermore, the controller can be designed as a master/slave controller, for example. In the master/slave control, one of the two loading vehicles 1 is selected as master and the other is selected as slave. The slave loading vehicle 1 is oriented by the master loading vehicle 1.

LIST OF REFERENCE NUMBERS

1 Loading vehicle
2 Chassis
3 Lifting device
4 Release device
5 Container holder
6 Container
7 Receiving region
8 Block stacking arrangement
9 Container storage slot
10 Loading space
11 Pass-through opening
12 Holding device
13 Holding pawl

What is claimed:

1. A block stacking arrangement comprising:
   multiple container stacking slots;
   a loading space arranged below the container stacking slots in a direction of gravity;
   a pass-through opening arranged between each container stacking slot and the loading space, via which a container is configured to be moved out of the loading space into the container stacking slot or from the container stacking slot into the loading space and which has a holder;
   wherein at least two pass-through openings have different sizes;
   a loading vehicle configured to be moved in the loading space;
   the loading vehicle having a lifter by means of which a container from the loading space is configured to be placed in a container stacking slot or can be removed from the container stacking slot;
   the lifter being fastened on one side to a chassis of the loading vehicle;
   the loading vehicle being a first loading vehicle and a second loading vehicle configured to be moved in the loading space synchronously with the first loading vehicle;
   the lifter of the first loading vehicle being opposite the lifter of the second loading vehicle.

2. The block stacking arrangement according to claim 1, wherein:
   the pass-through opening of each container stacking slot is matched to a base area of the container stacking slot.

3. The block stacking arrangement according to claim 1, wherein:
   the holder has at least two holding pawls diametrically opposed to each other.

4. The block stacking arrangement according to claim 1, wherein;
   the first and second loading vehicles have a common controller.

5. The block stacking arrangement according to claim 4, wherein:
   the controller is configured as a master/slave controller.

6. A method for operating a block stacking arrangement having multiple container stacking slots and a loading space arranged below the container stacking slots in a direction of gravity, a pass-through opening being arranged between each container stacking slot and the loading space, said pass-through opening having a holder, wherein at least two pass-through openings are of different sizes, said method comprising:

selecting a container stacking slot depending on the size of the container;

storing at least one container in the container stacking slot starting from the loading space;

removing the at least one container from the container stacking slot into the loading space;

the storing and removing of the method are carried out by at least one loading vehicle with a lifter;

the lifter being arranged on one side of a chassis of the loading vehicle; and the loading vehicles being moved synchronously at least at times.

7. The method according to claim 6, wherein:
the at least one loading vehicle actuates the holder.

8. The method according to claim 6, wherein:
the loading vehicles are controlled by a common controller.

9. The method according to claim 6, wherein:
the controller operates on the basis of the master/slave principle.

\* \* \* \* \*